United States Patent Office 2,716,121
Patented Aug. 23, 1955

2,716,121

BASIC TERTIARY PIPERIDINO ALCOHOLS

John Joseph Denton, Somerville, N. J., assignor to American Cyanamid Company, New York, N. Y., a corporation of Maine No Drawing. Application November 3, 1949,
Serial No. 125,383

2 Claims. (Cl. 260—294.7)

The present invention is concerned with synthetic, physiologically-active, basic propanols. As such the present application constitutes a continuation-in-part of my copending application, Serial No. 691,885, filed August 20, 1946, now abandoned.

Many different synthetic compounds, pharmacologically active as anti-spasmodics and local anesthetics, have been synthesized from time to time. The more active and apparently useful of these compounds have in general comprised fairly complex molecules containing at least one ester grouping. This grouping was generally accepted as being essential on the basis of analogy to the naturally-occurring extractives which were considered esters of tropic or pseudo-tropic acids.

Unfortunately, for one reason or another, many if not most of these compounds were not wholly satisfactory. Among other factors, the presence of the ester grouping introduces a chemically labile structure which adds to the instability of the molecule. This instability creates difficulty in the laboratory, making the preparation, purification, and handling of the materials extremely difficult. Further, modification may occur in several ways in the animal organism in which the compound is attempted to be used. For example, the compound may break down into other compounds which are ineffectual, or which are irritating, or which may even be highly toxic.

It is, therefore, the principal object of the present invention to develop a series of compounds which are physiologically active, and especially as anti-spasmodics. In so doing, it is a further and added object to develop materials which are not subject to the objectionable breakdown which so frequently characterized the more active of the esters previously used.

In accomplishing these objects it has been found that the ester grouping is quite unnecessary. It has been found, in accordance with the present invention, that the desirable characteristics are evidenced by a group of basic nitrogenous tertiary alcohols containing no ester grouping.

In particular the present application contemplates the basic tertiary alcohols of the general formula

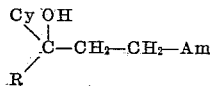

in which Cy, R and Am have the values noted immediately below.

Cy and R by their position in the molecule may be interchangeable. Cy represents a cycloaliphatic radical of 5–7 carbon atoms such as the cyclopentyl, cyclohexyl and methylcyclohexyl radicals. R represents an aryl radical such as the phenyl, tolyl, xylyl and the mono- and di- ethyl, methoxy, hydroxy, and chloro- or bromo- substituted phenyl radicals.

Am represents a tertiary amino grouping. It may be in a dialkylamino radical such as

in which Alk is a radical selected from the alkyl radicals of from about one to four carbon atoms. It may also be in an N-heterocylic group including one or more rings such as the 1-piperidyl, 1-piperazyl, 1-(4-methylpiperazyl), 4-morpholinyl and 2-(1,2,3,4-tetrahydroisoquinolyl) radicals. The bond to the heterocyclic substituent should be to the heterocyclic nitrogen atom.

From the foregoing it will be seen that the compounds of the present invention may vary very widely in scope and structure. Typical illustrative compounds of the type having the structural formula and values noted above are those contained in the following table of compounds in which Cy, R and Am have the designated values.

TABLE I

| Cy | R | Am |
|---|---|---|
| cyclopentyl | phenyl | 1-piperidyl |
| cyclohexyl | do. | dimethylamino |
| Do | do. | diethylamino |
| Do | do. | dipropylamino |
| Do | do. | dibutylamino |
| Do | do. | 1-piperidyl |
| Do | do. | 4-morpholinyl |
| Do | do. | 2-(1,2,3,4,-tetrahydroisoquinolyl) |
| Do | do. | 1-(4-methyl piperazyl) |
| methylcyclohexyl | do. | 1-piperidyl |
| cyclohexyl | p-tolyl | Do. |
| Do | 2,4-xylyl | Do. |
| Do | p-chlorophenyl | Do. |
| Do | 4-methoxyphenyl | Do. |
| Do | 2,4-dimethoxyphenyl | Do. |

In general, the basic propanols of the present invention comprise crystalline solids, usually having a sharp melting point, although some are inclined to sinter slightly just below the melting point. Some of the compounds, however, are so difficultly crystallizable as to appear to be permanent oils and some few appear actually to be permanent oils. The crystalline compounds appear to be free from color when pure. Most of the alcohols are relatively insoluble in water but are readily soluble in ether and in alcohol-ether mixtures, pyridine and the like.

The alcohols readily form crystalline addition salts, such as the hydrochloride, nitrate, citrate and the like, by reacting the alcohol in solution with the desired acid in the ordinary way. The hydrochlorides, for example, are readily formed and are soluble in aqueous solution.

The quaternary salts such as the methochloride, methobromide, methiodide, ethobromide, ethiodide, and the like are also readily formed. The quaternary salts appear to have substantially the same activity as the addition salts of the propanols, but a considerably longer period of anti-spasmodic activity. Accordingly the quaternary salts of the propanols also possess marked utility for pharmacological experiments.

It is surprising that the basic propanols of this invention should possess anti-spasmodic properties in view of the previously considered desirability of the ester grouping. Especially is this a surprising feature in view of the fact that secondary alcohols of similar structure, for example, 3-(1-piperidyl)-1-phenyl-1-propanol and the like possess no appreciable pharmacological activity either as anesthetics or spasmolytics.

The specific structural limitations on the propanols possessing the desired properties is even more surprising. It is necessary to have the cyclic substituents on the 1-carbon atom; since, when those groups represented by Cy and R in the general formula above are both replaced by alkyl groups, such as methyl or ethyl, and Am is a dialkyl amino radical there is no antispasmodic activity. There is very slight activity when Cy and R are alkyl groups and Am is a heterocycle such as 1-piperidyl radical. On the other hand, when both Cy and R are cyclic substituents, Am may be either a dialkyl amino radical or a heterocycle such as 1-piperidyl and the compound will have useful activity.

Secondary alcohols such as those previously noted were prepared by catalytic hydrogenation of the corresponding ketone. The new basic propanols of the present invention being of entirely different type, cannot be prepared by the same type of synthesis. It was found, however, that by judicious selection of reactants the compounds could readily be synthesized.

A synthesis has been developed for these basic propanols which is general and effective in operation. This process involves the addition of a suitable Grignard reagent to the proper basic ketone in the presence of a suitable solvent for both. Heating under a gentle refluxing for sufficient time to complete the reaction, followed by hydrolysis produces the desired basic tertiary alcohol. A typical illustration of the reaction may be indicated as follows:

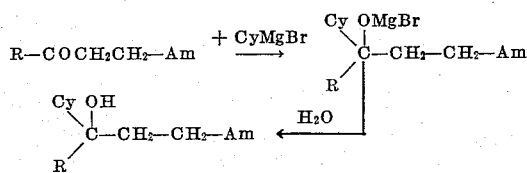

Since the first stage in this reaction must be carried out under conditions which are not conducive to hydrolysis, a dialkyl ether, for example diethyl or dibutyl ether and the like, has been found to be a wholly satisfactory solvent.

Several precautionary measures should be observed for best operation. Since the first step, addition of the Grignard reagent, must be carried out under conditions which are not conducive to hydrolysis, the solvent whether an ether, a benzene-pyridine mixture or the like, should be essentially anhydrous. Choice of the particular halogen used in the Grignard reagent may have certain advantages in individual cases. In general, the chloride, bromide and iodide may all be used. In some cases, however, the reagent itself apparently tends to form an insoluble complex with the ketone. In such cases the chloride appears to produce the least insoluble complexes and therefore may be preferable. For a similar reason, in such cases the use of a higher boiling solvent such as dibutyl ether may become preferable in order to utilize increased temperature and thereby improve the solubility.

The amount of Grignard reagent chosen also has an effect on the yield. Apparently this again may be due to the formation of a complex. The latter is believed to form but to break down on hydrolysis. For this reason it appears that some of the reagent is not available for further reaction. In any case, a considerable increase over an equimolecular amount of the Grignard reagent ordinarily produces a definitely increased yield. Above about two molecular equivalents, however, further increase in the amount used produces a markedly diminishing return. About two moles of Grignard reagent per mole of ketone appears to be preferable range.

The invention will be illustrated in conjunction with the following examples, which are to be taken as illustrative only and not by way of limitation. All parts are by weight unless otherwise noted.

*Example 1.—3-(1-piperidyl)-1-cyclohexyl - 1 - phenyl-1-propanol*

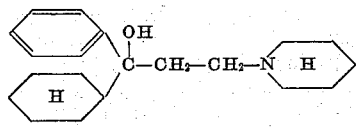

To an absolute ethyl ether solution of cyclohexylmagnesium bromide (prepared from 261 parts of cyclohexyl bromide, 38.8 parts magnesium turnings and 700 parts by volume absolute ethyl ether) a dry solution of 174 parts omega-(1-piperidyl) - propiophenone in 600 parts by volume of ether is added, with stirring, at such a rate that gentle reflux is maintained with no external cooling or heating. The reaction mixture is stirred for about 5 hours and then allowed to stand at room temperature until reaction appears complete. While being cooled, the reaction mixture is then decomposed by the dropwise addition of 500 parts by volume of 2.5N hydrochloric acid, and finally is made strongly acidic to Congo red by the addition of concentrated hydrochloric acid. The resulting white solid is collected on a filter, air dried, redissolved in 2500 parts water at 95° C., and the resulting solution treated with decolorizing charcoal and clarified by filtration. The cooled filtrate is made alkaline with ammonia and the product, crude 3-(1-piperidyl)-1-cyclohexyl-1-phenyl-1-propanol is collected. The hydrochloride melts with decomposition in ten seconds in a bath held at 258.5° C. The alcohol melts at 114.3°-115.0° C.

*Example 2.—3-(1-piperidyl-1-cyclopentyl - 1 - phenyl-1-propanol hydrochloride*

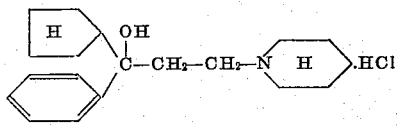

When the procedure of Example 1 is followed, with the exception that an equivalent molecular amount of cyclopentyl bromide is substituted for the cyclohexyl bromide, 3-(1-piperidyl)-1-cyclopentyl - 1 - phenylpropanol is obtained from the Grignard reaction mixture as a gummy salt. Dissolving this in the minimum amount of hot water, treating the solution with decolorizing charcoal, filtering and making the filtrate alkaline with ammonia gives the free propanol as an oil. Extraction of this oil by ether, drying the ether extract, and passing into it dry hydrogen chloride gas gives the product as its hydrochloride. The latter may be further purified by recrystallization from acetone.

*Example 3.—3-(4-morpholinyl)-1-cyclohexyl-1-phenyl-1-propanol*

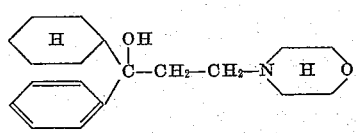

To a cooled solution of cyclohexylmagnesium chloride (prepared from 53.5 parts of magnesium turnings, 260.8 parts cyclohexyl chloride, and 1000 parts by volume of ethyl ether) a dry solution of 219.3 parts of omega-(4-morpholinyl)-propiophenone in 500 parts by volume of ethyl ether is added dropwise over a period of 1 hour with vigorous stirring. The reaction mixture is heated under reflux for 1 hour and then allowed to stand at room temperature until the reaction appears complete. With cooling and stirring, the mixture is then treated by the slow addition of 500 parts by volume of 5N hydrochloric acid. The resulting solid is collected on a filter and dissolved in 1000 parts by volume of warm pyridine. After clarification, the pyridine solution is diluted with 3000 parts by volume of water and chilled. The 3-(4-morpholinyl)-1-cyclohexyl-1-phenyl-1 - propanol crystallizes from the solution and is collected on a filter. It melts at 116.3°–117.0° C. Its hydrochloride sublimes at temperatures above 225° C.

*Example 4.—3-[2-(1,2,3,4-tetrahydroisoquinolyl)]-1-cyclohexyl-1-phenyl-1-propanol*

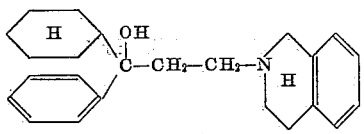

To a cool solution of cyclohexylmagnesium chloride (prepared from 332 parts of cyclohexyl chloride, 68.2 parts of magnesium turnings, and 1235 parts by volume of ether) a solution of 372 parts of omega-[2-(1,2,3,4-tetrahydroisoquinolyl)] propiophenone in 1300 parts by volume of ether is added over a period of 15 minutes at 5° to 35° C. with rapid stirring. Stirring is continued until reaction appears to be completed. The mixture is then chilled and slowly treated with 840 parts by volume of 5N hydrochloric acid. The solid formed is collected on a filter, dried, and dissolved in 600 parts by volume of boiling pyridine. The pyridine solution is clarified by filtration and is diluted with 3000 parts by volume of water and chilled. The solid 3-[2-(1,2,3,4-tetrahydroisoquinolyl)]-1-cyclohexyl-1-phenyl - 1 - propanol which precipitates is collected on a filter and purified by recrystallization from acetone or alcohol. The alcohol melts at 148.8°–149.4° C.; its hydrochloride at 219.6°–220.4 C.

*Example 5.—3-diethylamino-1-cyclohexyl-1-phenyl-1-propanol hydrochloride*

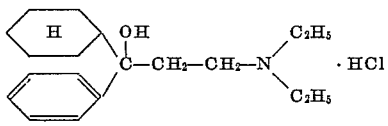

To a solution of cyclohexylmagnesium chloride, (prepared from 68.2 parts of magnesium turnings, 332 parts of cyclohexyl chloride and 1235 parts by volume of ether) a solution of 300 parts of omega-diethylaminopropiophenone in about 500 parts by volume of ethyl ether is added, with stirring, over a period of about 15 minutes at 5°–35° C. The reaction mixture is stirred at room temperature until the reaction appears to cease. The mixture is then chilled and treated by slowly adding 840 parts by volume of 5N hydrochloric acid. The solid formed is collected on a filter, dried, dissolved in 7000 parts by volume of boiling water, the solution being treated with decolorizing charcoal, filtered, and made alkaline by the addition of ammonium hydroxide. The oil which separates is extracted with ether and the ethereal solution is dried over anhydrous calcium chloride and filtered. When dry hydrogen chloride gas is passed into this ether solution, 3-diethylamino-1-cyclohexyl-1-phenyl - 1 - propanol hydrochloride precipitates as a white solid. It melts at 186.9°–187.4° C.

*Example 6.—3-dimethylamino-1-cyclohexyl-1-phenyl - 1-propanol hydrochloride*

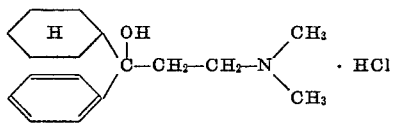

When, as in the procedure of Example 5, an equivalent amount of omega-dimethylaminopropiophenone is used instead of omega-diethylaminopropiophenone, 3-dimethylamino-1-cyclohexyl-1-phenyl - 1 - propanol hydrochloride, melting at 210.5–212.5° C., is obtained.

*Example 7.—3-(1-piperidyl)-1-cyclohexyl-1 - phenyl - 1-propanol ethobromide*

A solution of 24 parts of the propanol from Example 1 in 100 parts by volume of ethyl bromide slowly deposits the above ethobromide at ordinary temperature on standing. This ethobromide, when further purified by recrystallization from an alcohol-ether mixture, melts at 210°–214° C. and was found to contain 1.7 per cent moisture.

*Example 8.—3-diethylamino-1-cyclohexyl-1 - phenyl - 1-propanol ethobromide*

From a solution of 15 parts of 3-diethylamino-1-cyclohexyl-1-phenyl-1-propanol hydrochloride from Example 5 in a minimum amount of water, the free propanol base is made to separate an oil by addition of dilute caustic. The oil is extracted by ether, the ether solution is dried, and the ether evaporated. The residue is dissolved in 100 parts by volume of ethyl bromide, and, on standing at ordinary temperature, hte solution slowly deposits the above ethobromide. Further purified by recrystallization from an alcohol-ether mixture, the ethobromide melts at 181.3–183° C.

As noted above, the compounds of the present invention possess utility as anti-spasmodics. An indication of their effectiveness may be obtained by the commonly used test of ability to relax isolated rabbit intestinal strips which are immersed in a constant temperature test solution. In the following Table II, illustrative results are shown. In the tests shown, spasticity was induced by furfuryl trimethyl ammonium iodide in 0.1 mgm/100 ml. of Tyrode's solution. In the table, if the spasticity was counteracted to the extent that the gut assumed normal activity, relaxation is said to be 100%. If the gut shows essentially no contractions after the antispasmodic drug, the condition is recorded as complete relaxation. The test compounds have the formula

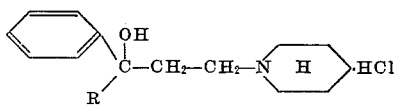

For purposes of comparison a similar test on "Trasentin," one of the best of the commercially-available synthetics, is shown.

TABLE II

| Compound (R) | Percent Relaxation (Average of number of tests) | | | | |
|---|---|---|---|---|---|
| | 0.0001 [1] | 0.0005 | 0.001 | 0.005 | 0.01 |
| Trasentin | 0 | 0 | 15 | 10 | 39 |
| Cyclohexyl | 9 | 59 | 88 | comp. | comp. |

[1] Dose, mgm./100 cc.

The compounds of the present invention are also effective against barium chloride spasm. Illustrative results of testing effectiveness in counteracting spasticity induced in isolated gut are found in the following Table III. Atropine is shown for purposes of comparison.

TABLE III

| Compound (R) | Percent Relaxation | | | |
|---|---|---|---|---|
| | 0.0001 [1] | 0.001 | 0.01 | 1.0 |
| Atropine | 0 | 4 | 5 | 19 |
| Cyclohexyl | 2 | 0 | 25 | 100 |

[1] Dose, mgm./100 cc.

I claim:

1. A compound of the group consisting of the tertiary amino alcohol of the formula

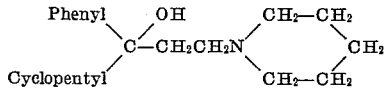

and acid addition salts thereof.

2. A compound selected from the group consisting of

1 - (4 - chlorophenyl) - 1 - cyclohexyl - 3 - (1 - piperidino)-propanol-1, acid addition and quaternary salts thereof.

References Cited in the file of this patent

UNITED STATES PATENTS

| | | |
|---|---|---|
| 828,846 | Forneau | Aug. 14, 1906 |
| 1,978,539 | Klarrer et al. | Oct. 30, 1934 |
| 2,411,664 | Miescher et al. | Nov. 26, 1946 |

FOREIGN PATENTS

| | | |
|---|---|---|
| 234,785 | Switzerland | Feb. 16, 1945 |
| 698,687 | France | Feb. 3, 1931 |

OTHER REFERENCES

Trefuel et al., Chem. Abst., vol. 24 (1930), p. 3502.
Mannich et al., Chem. Abst., vol. 22 (1928), pp. 590–1.
Campbell et al., Jour. Amer. Chem. Soc., vol. 60 (1938), pp. 1372–76.
Marie, Beill Soc. Chem. (4) 3 (1908), pp. 280–286.